(12) United States Patent
Kim et al.

(10) Patent No.: US 12,456,992 B2
(45) Date of Patent: Oct. 28, 2025

(54) AMPLIFIER DEVICE USING TRANSFORMER WITH MULTI-LOOP STRUCTURE AND COMMUNICATION DEVICE USING THE SAME IN WIRELESS COMMUNICATION SYSTEM

(71) Applicant: Samsung Electronics Co., Ltd., Suwon-si (KR)

(72) Inventors: Jungsik Kim, Suwon-si (KR); Dongki Kim, Suwon-si (KR); Seongkyun Kim, Suwon-si (KR); Hyohyun Nam, Suwon-si (KR); Daeyoung Lee, Suwon-si (KR); Chaejun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 18/305,738

(22) Filed: Apr. 24, 2023

(65) Prior Publication Data

US 2024/0322849 A1    Sep. 26, 2024

(30) Foreign Application Priority Data

Mar. 24, 2023    (KR) .................... 10-2023-0038907

(51) Int. Cl.
*H04B 1/04*    (2006.01)
*H03F 1/56*    (2006.01)
*H03F 3/21*    (2006.01)

(52) U.S. Cl.
CPC .............. *H04B 1/04* (2013.01); *H03F 1/565* (2013.01); *H03F 3/21* (2013.01)

(58) Field of Classification Search
None
See application file for complete search history.

(56) References Cited

U.S. PATENT DOCUMENTS 7,471,153 B2 * 12/2008 Kee ................. H03F 3/45188
330/276
8,704,193 B1 * 4/2014 Kholomeev ........... H01F 38/14
250/396 R (Continued)

FOREIGN PATENT DOCUMENTS

KR    10-2020-0141810 A    12/2020
KR    10-2022-0085562 A    6/2022

*Primary Examiner* — Pablo N Tran
(74) *Attorney, Agent, or Firm* — Jefferson IP Law, LLP

(57) ABSTRACT

A communication device configured to transmit/receive a radio frequency (RF) signal is provided. The device includes a transceiver including an amplifier device using a multi-loop inter-stage matching (ISM) transformer, and a processor configured to control an operation of the amplifier based on a signal strength during transmission/reception of the RF signal. The transformer is disposed between a first amplifier and a second amplifier and includes a plurality of primary loops and a plurality of secondary loops, each primary loop includes an inductor component having a different size and a different Q-factor and each secondary loop includes an inductor component having a different size and a different Q-factor. The processor adjusts an attenuation level of the transformer by controlling a switching connection to the first amplifier and the second amplifier for one primary loop among the plurality of primary loops and one secondary loop among the plurality of secondary loops.

15 Claims, 9 Drawing Sheets

(56) References Cited

U.S. PATENT DOCUMENTS

| | | | |
|---|---|---|---|
| 11,495,400 B2* | 11/2022 | Sutardja | H01F 17/0013 |
| 2005/0024178 A1 | 2/2005 | Ancey et al. | |
| 2013/0082810 A1 | 4/2013 | Feng et al. | |
| 2013/0207872 A1 | 8/2013 | Bakalski | |
| 2013/0267185 A1* | 10/2013 | Chen | H04B 1/44 |
| | | | 455/78 |
| 2017/0317658 A1* | 11/2017 | Gianesello | H04W 88/02 |
| 2020/0075232 A1* | 3/2020 | Sutardja | H01F 27/36 |
| 2020/0395158 A1 | 12/2020 | Kim et al. | |
| 2023/0031672 A1 | 2/2023 | Kim et al. | |
| 2023/0230764 A1* | 7/2023 | Sutardja | H01F 19/04 |
| | | | 336/192 |

* cited by examiner

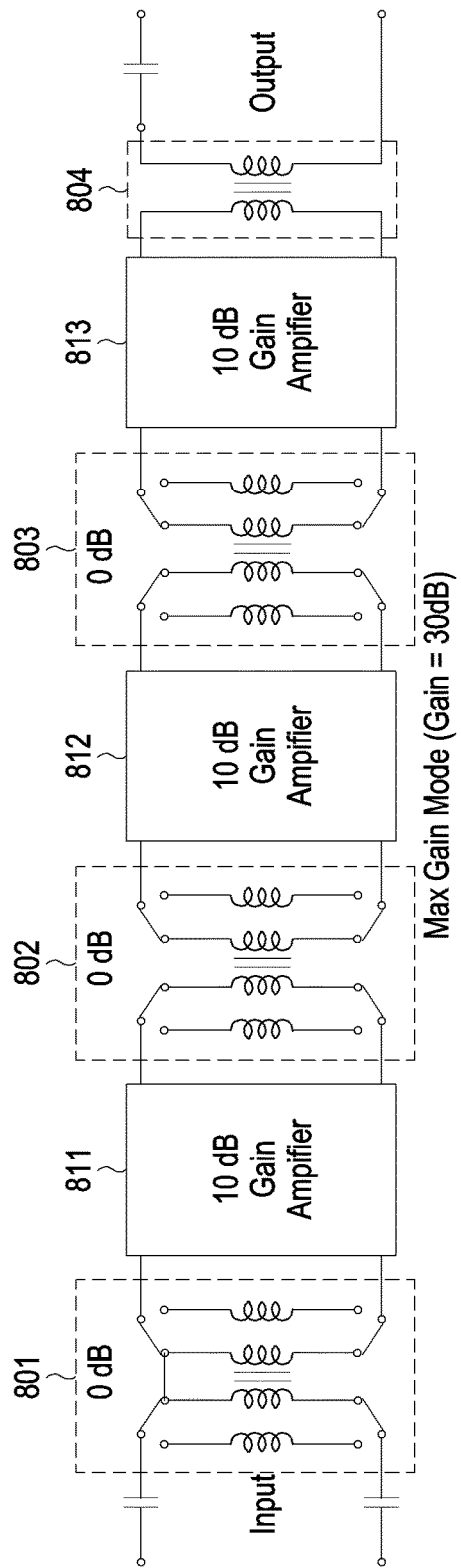
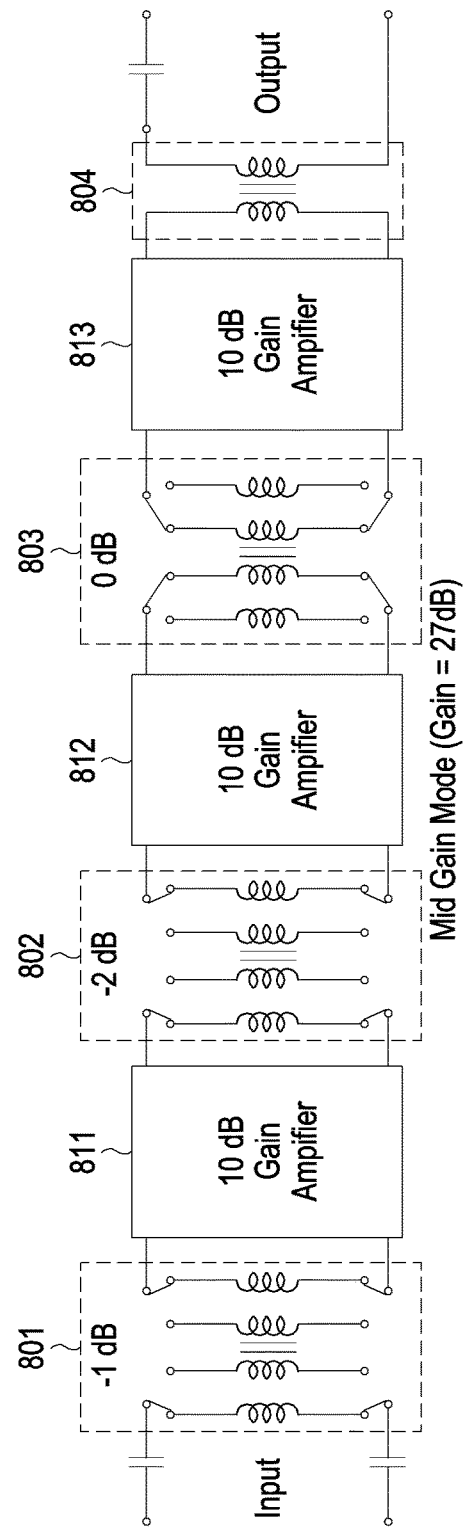
FIG. 8A
FIG. 8B

AMPLIFIER DEVICE USING TRANSFORMER WITH MULTI-LOOP STRUCTURE AND COMMUNICATION DEVICE USING THE SAME IN WIRELESS COMMUNICATION SYSTEM

CROSS-REFERENCE TO RELATED APPLICATION(S)

This application is based on and claims priority under 35 U.S.C. § 119(a) of a Korean patent application number 10-2023-0038907, filed on Mar. 24, 2023, in the Korean Intellectual Property Office, the disclosure of which is incorporated by reference herein in its entirety.

BACKGROUND

1. Field

The disclosure relates to an amplifier device for receiving and amplifying a radio signal in a wireless communication system and a receiving device using the amplifier device.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 microseconds (μsec), and thus will be 50 times as fast as 5G communication systems and have the 1/10 radio latency thereof.

In order to accomplish such a high data rate and an ultra-low latency, it has been considered to implement 6G communication systems in a terahertz band (for example, 95 gigahertz (GHz) to 3 terahertz (THz) bands). It is expected that, due to severer path loss and atmospheric absorption in the terahertz bands than those in millimeter wave (mmWave) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In a wireless communication system, a receiver is a device that amplifies the radio frequency (RF) signal input through an antenna using a low-noise amplifier (LNA) and frequency downconverts the amplified signal into an intermediate frequency band or a base band through a mixer. The receiver's receive operating range (Rx dynamic range) is determined based on the linearity that determines the maximum input level that may be allowed in the low-noise amplifier circuit and the noise figure (NF) that determines the minimum input level. The noise figure (NF) is an index indicating how much noise is added when the input signal passes through a certain device or circuit block.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an amplifier device using a transformer having a multi-loop structure in a wireless communication system and a communication device using the same.

Another aspect of the disclosure is to provide an amplifier device using a transformer having a multi-loop structure having an attenuator function in a wireless communication system and a communication device using the same.

Another aspect of the disclosure is to provide a radio frequency (RF) chip including an amplifier device using a transformer having a multi-loop structure having an attenuator function in a wireless communication system.

Additional aspects will be set forth in part in the description which follows and, in part, will be apparent from the description, or may be learned by practice of the presented embodiments.

In accordance with an aspect of the disclosure, a communication device configured to transmit/receive a radio frequency (RF) signal in a wireless communication system is provided. The communication device includes a transceiver including an amplifier device using a multi-loop inter-stage matching (ISM) transformer and a processor configured to control an operation of the amplifier device based on a signal strength during transmission/reception of the RF signal. The multi-loop ISM transformer is disposed between a first amplifier and a second amplifier and includes a plurality of primary loops and a plurality of secondary loops, wherein each primary loop includes an inductor component and having a different size and a different Q-factor and each secondary loop includes an inductor component and having a different size and a different Q-factor. The processor is configured to adjust an attenuation level of the multi-loop ISM transformer by controlling a switching connection to the first amplifier and the second amplifier for one primary loop among the plurality of primary loops and one secondary loop among the plurality of secondary loops in the multi-loop ISM transformer.

In accordance with another aspect of the disclosure, an amplifier device included in a communication device configured to transmit/receive a radio frequency (RF) signal in a wireless communication system is provided. The amplifier device includes a plurality of amplifiers and a multi-loop inter-stage matching (ISM) transformer disposed between a first amplifier and a second amplifier among the plurality of amplifiers and including a plurality of primary loops and a plurality of secondary loops, wherein each primary loop includes an inductor component and having a different size and a different Q-factor and each secondary loop includes an inductor component and having a different size and a different Q-factor. Input ends of the plurality of primary loops are connected to output ends of the first amplifier through first switches, and output ends of the plurality of secondary loops are connected to input ends of the second amplifier through second switches. One primary loop among the plurality of primary loops and one secondary loop among the plurality of secondary loops is connected to the first amplifier and the second amplifier, respectively, through the first switches and the second switches to adjust an attenuation level of the multi-loop ISM transformer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A, 8B, and 8C are views illustrating operations of an amplifier device using a multi-loop ISM transformer according to various embodiments of the disclosure;

Throughout the drawings, it should be noted that like reference numbers are used to depict the same or similar elements, features, and structures.

DETAILED DESCRIPTION

Figure 1:
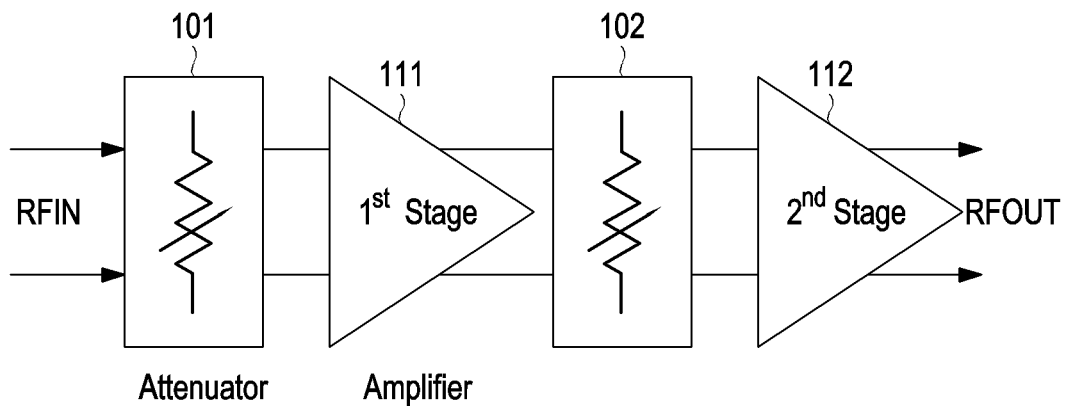
FIG. 1 is a view illustrating an example amplifier device used in a transmitter or a receiver in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this case, it should be noted that the same components in the accompanying drawings are indicated by the same reference numerals as much as possible. Further, it should be noted that the accompanying drawings of the disclosure are provided to aid understanding of the disclosure, and the disclosure is not limited to the form or arrangement illustrated in the drawings of the disclosure. When making the gist of the disclosure, the detailed description of known functions or configurations is skipped. It should be noted that in the following description, only parts necessary for understanding the operation according to various embodiments of the disclosure are described, and descriptions of other parts will be omitted not to make the gist of the disclosure unclear. Further, although the disclosure describes various embodiments using terms used in some communication standards (e.g., 3rd generation partnership project (3GPP)), this is merely an example for description. Various embodiments of the disclosure may be easily modified and applied in other communication systems.

In the disclosure, it should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction processing device for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" denotes a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more central processing units (CPUs) in a device or secure multimedia card. According to embodiments, a " . . . unit" may include one or more processors.

As used herein, each of such phrases as "A or B", "at least one of A and B", "at least one of A or B", "A, B, or C", "at least one of A, B, and C" and "at least one of A, B, or C," may include all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order).

FIG. 1 is a view illustrating an example amplifier device used in a communication device in a wireless communication system according to an embodiment of the disclosure.

In a wireless communication system, an amplifier device is a device that amplifies transmission/reception signals to an appropriate magnitude. A communication device, for example a transmitter or receiver, includes the amplifier device. The gain required for the amplifier device may vary depending on the communication environment. For example, as the distance between the base station and the UE decreases, the signal strength of the downlink signal received by the UE increases. Therefore, the gain of the amplifier device in the UE should be reduced. As the distance between the base station and the UE increases, the signal strength of the downlink signal received by the UE decreases. Therefore, the gain of the amplifier device in the UE should be increased. Therefore, it is necessary to be able to vary the gain of the amplifier device and, to that end, it is possible to adjust the gain of the amplifier device by disposing an attenuator at the front end or the rear end of the amplifier device.

Referring to FIG. 1, the amplifier device of FIG. 1 may amplify and output an input signal, e.g., a radio frequency (RF) signal, into differential signals having a phase difference of 180 degrees. The amplifier device of FIG. 1 includes a plurality of amplifiers 111, 112, . . . , and a plurality of attenuators 101, 102, . . . connected to a front end, a rear end, or between the plurality of amplifiers 111, 112, . . . . Each of the plurality of amplifiers 111, 112, . . . constitutes a plurality of amplifier stages ($1^{st}$ stage, $2^{nd}$ stage, . . . ) for amplifying and outputting an input signal. It is important that the amplifier device is designed to have a minimum noise figure (NF) in a range in which linearity is maintained. Further, in the reception device in the wireless communication system, the amplifier device may be saturated due to a large peak-to-average power ratio (PAPR), so that reception performance may be deteriorated. Therefore, in conventional amplifier devices, an attenuator is basically required to lower the power level of the input signal. However, as in the example of FIG. 1, when the plurality of attenuators 101, 102, . . . are disposed or additionally disposed at the fronts and/or rears of the plurality of amplifiers 111, 112, . . . , impedance matching of the amplifier device is required.

Figure 2:
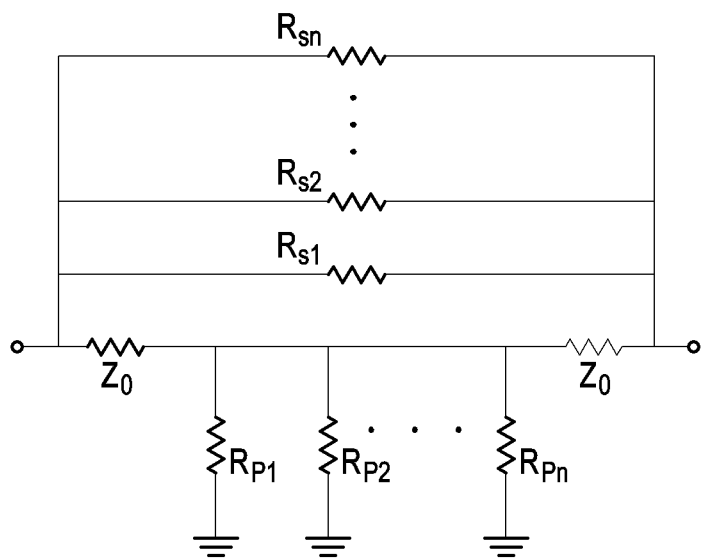
FIG. 2 is a view illustrating an example attenuator included in an amplifier device in a wireless communication system according to an embodiment of the disclosure.

FIG. 2 is a view illustrating an example attenuator included in an amplifier device in a wireless communication system, and illustrates an example of a bridged-T attenuator having n attenuation states according to an embodiment of the disclosure.

Referring to FIG. 2, the attenuator includes a plurality of series resistors $R_{s1}$, $R_{s2}$, . . . , $R_{sn}$ and a plurality of parallel resistors $R_{p1}$, $R_{p2}$, . . . , $R_{pn}$. $Z_0$ is the characteristic impedance in the attenuator. When the synthesis resistance of the plurality of series resistors $R_{s1}$, $R_{s2}$, . . . , $R_{sn}$ is referred to as Rs, and the synthesis resistance of the plurality of parallel resistors $R_{p1}$, $R_{p2}$, . . . , $R_{pn}$ is referred to as Rp, Rs and Rp may be implemented using the on resistance Ron of a transistor such as a metal oxide semiconductor field effect transistor (MOSFET). The on resistor Ron refers to a drain-source resistance when the MOSFET is operated (ON). In FIG. 2, the attenuation state may be increased by increasing the series resistor Rs and the parallel resistor Rp. As the attenuation state increases, the size of the attenuator increases proportionally. Further, when an attenuator is disposed between the amplifiers, an impedance matching circuit is additionally required, so that the overall circuit size of the amplifier device is further increased. The transistor in which the series resistor Rs and the parallel resistor Rp are implemented has parasitic capacitance, so that impedance matching of the amplifier device may vary for each attenuation state. Therefore, the performance of the amplifier device using the conventional attenuator as shown in FIG. 2 may vary for each attenuation state.

Figure 3:
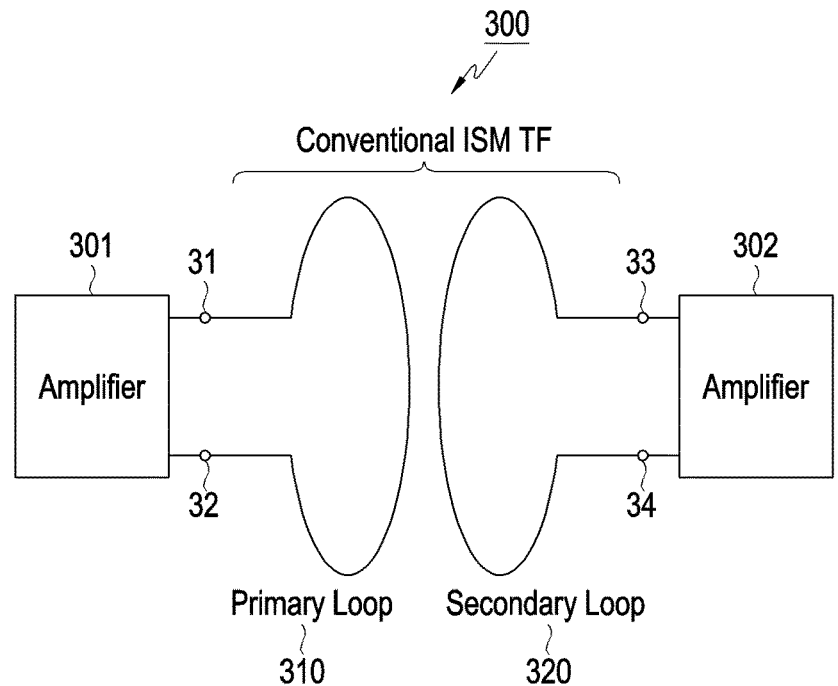
FIG. 3 is a view illustrating an example amplifier device using a general inter-stage matching (ISM) transformer in a wireless communication system according to an embodiment of the disclosure.

FIG. 3 is a view illustrating an example amplifier device using a general inter-stage matching (ISM) transformer in a wireless communication system according to an embodiment of the disclosure.

Referring to FIG. 3, an amplifier device 300 of FIG. 3 includes first and second amplifiers 301 and 302, and an ISM amplifier ISM TF disposed between the first amplifier 301 and the second amplifier 302. The ISM amplifier includes one primary loop 310 and one secondary loop 320. Each of the primary loop 310 and the secondary loop 320 is implemented as a coil and includes an inductor component. The input ends 31 and 32 of the primary loop 310 are connected to the output ends of the first amplifier 301, and the output ends 33 and 34 of the secondary loop 320 are connected to the input ends of the second amplifier 302. The ISM amplifier ISM TF may be used for impedance matching between amplifier stages. In FIG. 3, a conventional ISM transformer does not perform an attenuator function.

Figure 4:
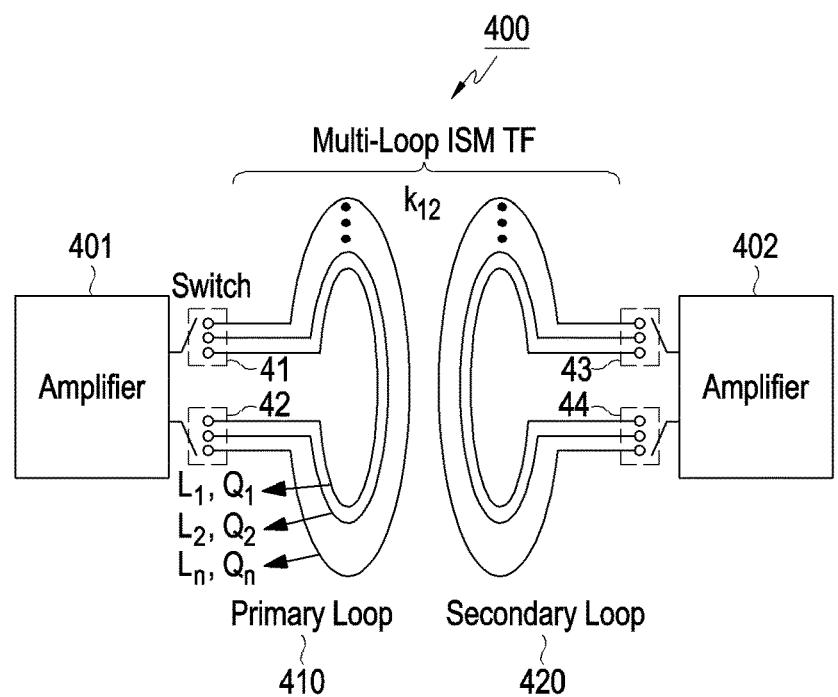
FIG. 4 is a view illustrating an example amplifier device using an ISM transformer having a multi-loop structure in a wireless communication system according to an embodiment of the disclosure.

FIG. 4 is a view illustrating an example amplifier device using an ISM transformer having a multi-loop structure in a wireless communication system according to an embodiment of the disclosure.

Referring to FIG. 4, an amplifier device 400 of FIG. 4 includes first and second amplifiers 401 and 402, and an ISM transformer ISM TF (hereinafter, referred to as a multi-loop ISM transformer) having a multi-loop structure disposed between the first amplifier 401 and the second amplifier 402. The multi-loop ISM transformer includes n primary loops 410 and n secondary loops 420. Each of the n primary loops 410 and the n secondary loops 420 includes an inductor component. Each loop of the n primary loops 410 has a different size/width and Q-factor, and each loop of the n secondary loops 420 corresponding to the n primary loops 410 also has a different size/width and Q-factor. The Q-factor is defined as the ratio of energy, stored in the resonance circuit, to energy loss and represents the loss of the resonance circuit. A high Q value denotes less energy loss than stored energy, and a low Q value denotes more energy loss than stored energy. The input ends of the primary loops 410 are connected to the output ends of the first amplifier 401 through first switches 41 and 42, and the output ends of the secondary loops 420 are connected to the input ends of the second amplifier 402 through second switches 43 and 44.

The processor (not shown) in the communication device including the amplifier device of FIG. 4 controls switching of the first switches 41 and 42 and the second switches 43 and 44 in the multi-loop ISM transformer to control one primary loop among the n primary loops 410 and one secondary loop among the n secondary loops 420 to operate as a resonance circuit. The multi-loop ISM transformer may be used for impedance matching between amplifier stages, and may be included in an amplifier device in a multi-stage structure.

Referring to FIG. 4, the n primary loops 410 include a first primary loop, a second primary loop, . . . , and an nth primary loop in a direction from the inner loop to the outer loop, and the first to nth primary loops 410 are configured to have different inductance values $L_1$, $L_2$, . . . , and $L_n$ and different Q values $Q_1$, $Q_2$, . . . , and $Q_n$. Similarly, the n secondary loops 420 also include a first secondary loop, a second secondary loop, . . . , and an nth secondary loop in a direction from the inner loop to the outer loop, and the first to nth secondary loops 420 are configured to have different inductance values and different Q values corresponding to the first to nth primary loops 410.

Referring to FIG. 4, when the processor controls switching of the first switches 41 and 42 and the second switches 43 and 44 such that the nth primary loop and the nth secondary loop, which are outer loops of the multi-loop ISM transformer, operate as resonance circuits, the multi-loop ISM transformer of FIG. 4 may operate in the same manner as the conventional ISM transformer of FIG. 3. In the disclosure, the multi-loop ISM transformer has an attenuator function capable of adjusting an attenuation level, and as a primary loop and a secondary loop are selected from an outer loop toward an inner loop by switching control of the first switches 41 and 42 and the second switches 43 and 44, a coupling coefficient corresponding to a physical size of a loop in the transformer is reduced, and the attenuation level is increased. When the mutual induction coefficient between the primary loop and the secondary loop connected through switching in the multi-loop ISM transformer is $M_{12}$ and a coupling coefficient is $k_{12}$, the coupling coefficient has a proportional relationship with the mutual induction coefficient, and the attenuation level has an inverse proportional relationship with the coupling coefficient. For reference, the relationship between the coupling coefficient $k_{12}$ and the mutual induction coefficient $M_{12}$ in an ideal transformer may be expressed as shown in Equation 1 below.

$$k_{12} = \frac{M_{12}}{\sqrt{L_1 \times L_2}} \qquad \text{Equation 1}$$

In Equation 1, $L_1$ is the inductance of the primary loop, and $L_2$ is the inductance of the secondary loop. The n primary loops 410 and the n secondary loops 420 have Q values set to stably perform impedance matching according to an attenuation level controlled by the amplifier device.

The processor of the communication device using the amplifier device of FIG. 4 may control the attenuator function of the multi-loop ISM transformer in the following manner.

For example, it is assumed that the communication device is a UE that receives a downlink signal from a base station. When the received signal strength of the downlink signal is strong as the distance between the base station and the UE is relatively short, the first switches 41 and 42 and the second switches 43 and 44 are switching-controlled to increase the attenuation level so that the inner primary loop and the secondary loop operate as resonance circuits. When the received signal strength of the downlink signal is weak due to the relatively long distance between the base station and the UE, the first switches 41 and 42 and the second switches 43 and 44 are switching-controlled so that the attenuation level is reduced or the attenuator function is not performed so that the outer primary loop and the secondary loop operate as resonance circuits. Further, when the distance between the base station and the UE is neither long nor short and the received signal strength of the downlink signal is about the medium, the first switches 41 and 42 and the second switches 43 and 44 are switching-controlled so that the attenuation level becomes the medium so that the primary loop and the secondary loop of the middle portion operate as a resonance circuit. For convenience of description, the case where the amplifier device of FIG. 4 is applied to a receiver of a UE that receives a downlink signal from a base station has been described as an example, but the amplifier device of FIG. 4 may be applied to a transmitter of a UE that transmits an uplink signal to the base station. Also, the amplifier device of FIG. 4 may be applied to a base station that transmits a downlink signal to a UE or receives an uplink signal from the UE.

Figure 5:
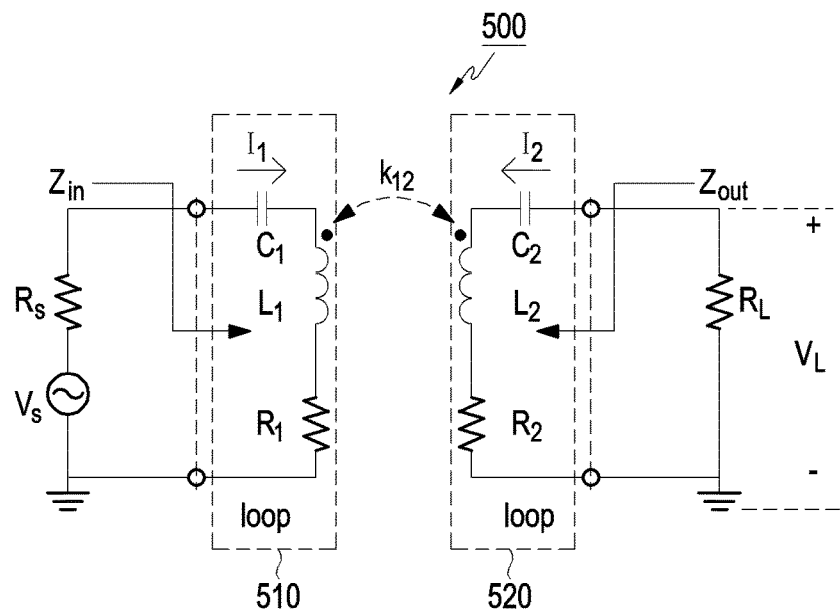
FIG. 5 is a view illustrating an equivalent circuit of a multi-loop ISM transformer according to an embodiment of the disclosure.

FIG. 5 is a view illustrating an equivalent circuit of a multi-loop ISM transformer according to an embodiment of the disclosure.

The multi-loop ISM transformer described in FIG. 4 may be represented by equivalent circuit 500 of FIG. 5. Referring to FIG. 5, an equivalent circuit 500 includes a first radio link control (RLC) circuit 510 corresponding to one primary loop connected among n primary loops 410 according to switching of the first switches 41 and 42 in FIG. 4 and a second RLC circuit 520 corresponding to one secondary loop connected among n secondary loops 420 according to switching of the second switches 43 and 44. When the coupling coefficient between the first RLC circuit 510 and the second RLC circuit 520 is $k_{12}$, the attenuation level in the multi-loop ISM transformer is inversely proportional to the coupling coefficient.

In the first RLC circuit 510 and the second RLC circuit 520 constituting the equivalent circuit 500, circuit components including resistor R, inductance L, and capacitance C components may be defined as shown in Table 1 below. In Table 1, $Q_1$ and $Q_2$ are Q-factors of the primary loop and the secondary loop, respectively, and in FIG. 5, $Z_{in}$ and $Z_{out}$ denote the input impedance and the output impedance, respectively, of the multi-loop ISM transformer, $V_S$ and $V_L$ denote the source voltage and the load voltage, respectively, of the multi-loop ISM transformer, and $I_1$ and $I_2$ denote currents flowing in the primary loop and the secondary loop, respectively.

TABLE 1

| | |
|---|---|
| $R_S$ = Source Impedance | $R_L$ = Load Impedance |
| $C_1$ = TR Parasitic Capacitance | $C_2$ = TR Parasitic Capacitance |
| $L_1$ = Primary Loop Inductance | $L_2$ = Secondary Loop Inductance |
| $R_1$ = Primary Loop Resistance | $R_2$ = Secondary Loop Resistance |
| $Q_1 = \omega L_1/R_1$ | $Q_2 = \omega L_2/R_2$ |

In the equivalent circuit 500 of FIG. 5, since the input impedance and the output impedance of the amplifier device using the multi-loop ISM transformer have capacitive reactance, only the multi-loop ISM transformer may be connected to operate as a magnetic coupling resonator (MRR) without using an additional capacitor. The equivalent circuit 500 of FIG. 5 may be represented by using the Kirchhoff voltage law (KVL) as shown in Equation 2 below. In Equation 2, $M_{12}$ is the mutual induction coefficient between the primary loop and the secondary loop connected through switching in the multi-loop ISM transformer.

$$\left(R_S + R_1 + j\omega L_1 + \frac{1}{j\omega C_1}\right)I_1 + j\omega M_{12}I_2 = V_S \quad \text{Equation 2}$$

$$j\omega M_{12}I_1 + \left(R_L + R_2 + j\omega L_2 + \frac{1}{j\omega C_2}\right)I_2 = 0$$

Equation 2 may be summarized, for the currents $I_1$ and $I_2$ flowing in the primary loop and the secondary loop, into Equation 3 below.

$$\begin{bmatrix} I_1 \\ I_2 \end{bmatrix} = \begin{bmatrix} R_S + R_1 & j\omega_0 M_{12} \\ j\omega_0 M_{12} & R_L + R_2 \end{bmatrix}^{-1} \begin{bmatrix} V_S \\ 0 \end{bmatrix} \quad \text{Equation 3}$$

Equation 3 may be summarized, by using the coupling coefficient $k_{12}$ for the current $I_1$ flowing in the primary loop, into Equation 4 below.

$$I_1 = V_S\left(\frac{R_L R_2}{R_1 R_2 Q_1 Q_2 k_{12}^2 + R_1 R_2 + R_1 R_L}\right) \quad \text{Equation 4}$$

Since the mutual induction coefficient $M_{12}$ and the coupling coefficient $k_{12}$ between the primary loop and the secondary loop are proportional to each other, when the coupling coefficient $k_{12}$ corresponding to the size of the primary loop and the secondary loop decreases, the amount of current flowing through the primary loop and the secondary loop increases as shown in Equation 4. In this case, the loss of the transformer formed by the primary loop and the secondary loop is increased. When the coupling coefficient $k_{12}$ increases, the amount of current flowing through the primary loop and the secondary loop decreases as shown in Equation 4. In this case, the loss of the transformer formed by the primary loop and the secondary loop is reduced. In the disclosure, since each loop of the n primary loops 410 and each loop of the n secondary loops 420 constituting the multi-loop ISM transformer have different sizes/widths, the attenuation level of the multi-loop ISM transformer may be controlled according to the sizes/widths of the primary loop and the secondary loop connected according to the switching of the first switches 41 and 42 and the second switches 43 and 44. For example, when an outer loop with a large coupling coefficient (the size/width of the loop is relatively large) is connected through switching, the attenuation level of the multi-loop ISM transformer decreases, and when an inner loop with a small coupling coefficient (the size/width of the loop is relatively small) is connected through switching, the attenuation level of the multi-loop ISM transformer increases.

Further, in the equivalent circuit 500 of the multi-loop ISM transformer according to the disclosure, the input impedance $Z_{in}$ and the output impedance $Z_{out}$ may be represented by using the coupling coefficient $k_{12}$ and the Q-factor as shown in Equation 5 and Equation 6 below.

$$Z_{IN} = \frac{V_S}{I_1} = \frac{R_1 R_2 Q_1 Q_2 k_{12}^2 + R_1 R_2 + R_1 R_L}{R_L + R_2} \qquad \text{Equation 5}$$

$$Z_{OUT} = \frac{R_1 R_2 Q_1 Q_2 k_{12}^2 + R_1 R_2 + R_1 R_S}{R_S + R_1} \qquad \text{Equation 6}$$

In the disclosure, in order to increase the loss occurring in the multi-loop ISM transformer, in other words, to increase the attenuation level, the inner primary loop and the secondary loop may be switched and connected such that the coupling coefficient $k_{12}$ is reduced. In this case, if the Q-factors of the corresponding primary loop and secondary loop are designed to be small, the impedance matching may be maintained by matching the input impedance and the output impedance according to the increased attenuation level. Further, in order to reduce the loss occurring in the multi-loop ISM transformer, in other words, to reduce the attenuation level, the outer primary loop and the secondary loop may be switched and connected so that the coupling coefficient $k_{12}$ increases. In this case, if the Q-factors of the corresponding primary loop and secondary loop are designed to be large, the impedance matching may be maintained by matching the input impedance and the output impedance according to the reduced attenuation level. In the disclosure, it is possible to maintain the impedance matching function of the multi-loop ISM transformer while adaptively controlling the attenuation level according to the communication environment by using the plurality of primary loops and the plurality of secondary loops.

Figure 6:
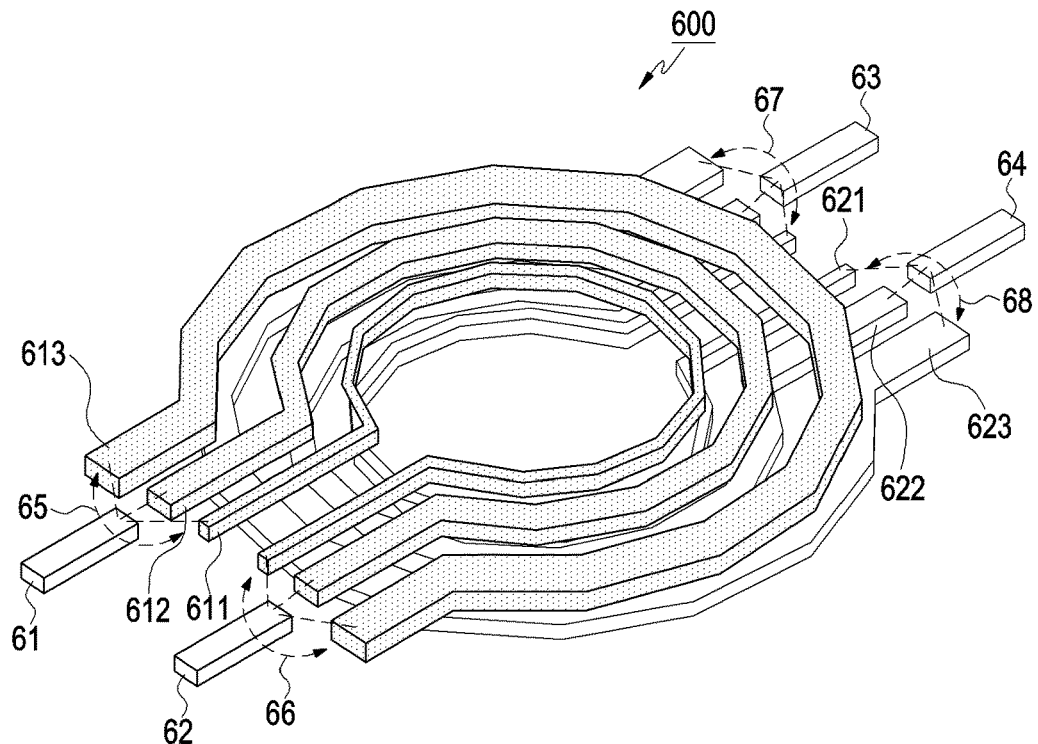
FIG. 6 is a view illustrating an example configuration of primary loops and secondary loops in a multi-loop ISM transformer according to an embodiment of the disclosure.

FIG. 6 is a view illustrating an example configuration of primary loops and secondary loops in a multi-loop ISM transformer according to an embodiment of the disclosure.

The configuration of the multi-loop ISM transformer including n primary loops and n secondary loops has been described in connection with the example of FIG. 4. FIG. 6 exemplifies a configuration of a multi-loop ISM transformer 600 including three primary loops 611, 612, and 613 and three secondary loops 621, 622, and 623 for convenience. Each loop of the three primary loops 611, 612, and 613 has a different size/width and Q-factor, and each loop of the three secondary loops 621, 622, and 623 corresponding to the three primary loops 611, 612, and 613 also has a different size/width and Q-factor. The input ends of the three primary loops 611, 612, and 613 are connected to output ends 61 and 62 of the first amplifier (not shown) through first switches 65 and 66, and the output ends of the three secondary loops 621, 622, and 623 are connected to input ends 63 and 64 of the second amplifier (not shown) through second switches 67 and 68.

Referring to FIG. 6, the three primary loops 611, 612, and 613 include a first primary loop 611, a second primary loop 612, and a third primary loop 613 in the direction from the inner loop to the outer loop, and the first to third primary loops 611, 612, and 613 are configured to have different inductance values $L_1$, $L_2$, and $L_3$ and different Q values $Q_1$, $Q_2$, and $Q_3$. Likewise, the three secondary loops 621, 622, and 623 also include a first secondary loop 621, a second secondary loop 622, and a third secondary loop 623 in the direction from the inner loop to the outer loop, and the first to third secondary loops 621, 622, and 623 are configured to have different inductance values and different Q values corresponding to the first to third primary loops 611, 612, and 613. For example, the inductances of the nth primary loop and the nth secondary loop may be different. In the disclosure, since the primary/secondary loop is used by resonating with the capacitor of the equivalent circuit described in FIG. 5, when the capacitances of the nth primary loop and the nth secondary loop are different, and the inductances are also different. The capacitance may be the parasitic capacitance of an amplifier connected to the front and/or rear of the transformer.

In the disclosure, the multi-loop ISM transformer may operate according to operation modes divided based on the degree of the attenuation level. For example, the multi-loop ISM transformer of FIG. 6 may operate according to operation modes divided into a through mode, a first attenuation mode, and a second attenuation mode. In the disclosure, the through mode may refer to an operation mode in which the attenuator function is not performed in the multi-loop ISM transformer, and the first and second attenuation modes may refer to operation modes in which the attenuator function is differentiated in the attenuation level when the attenuator function is performed in the multi-loop ISM transformer.

Figure 7A:
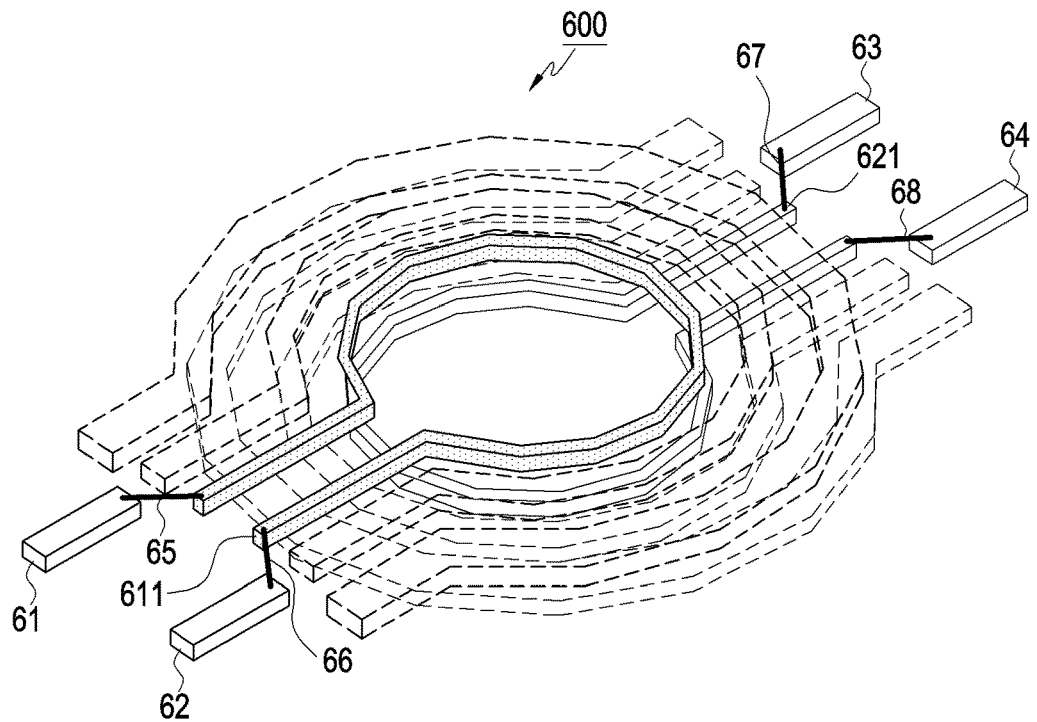
FIGS. 7A, 7B, and 7C are views illustrating operations according to each operation mode of the multi-loop ISM transformer of FIG. 6 according to various embodiments of the disclosure.
Figure 7B:
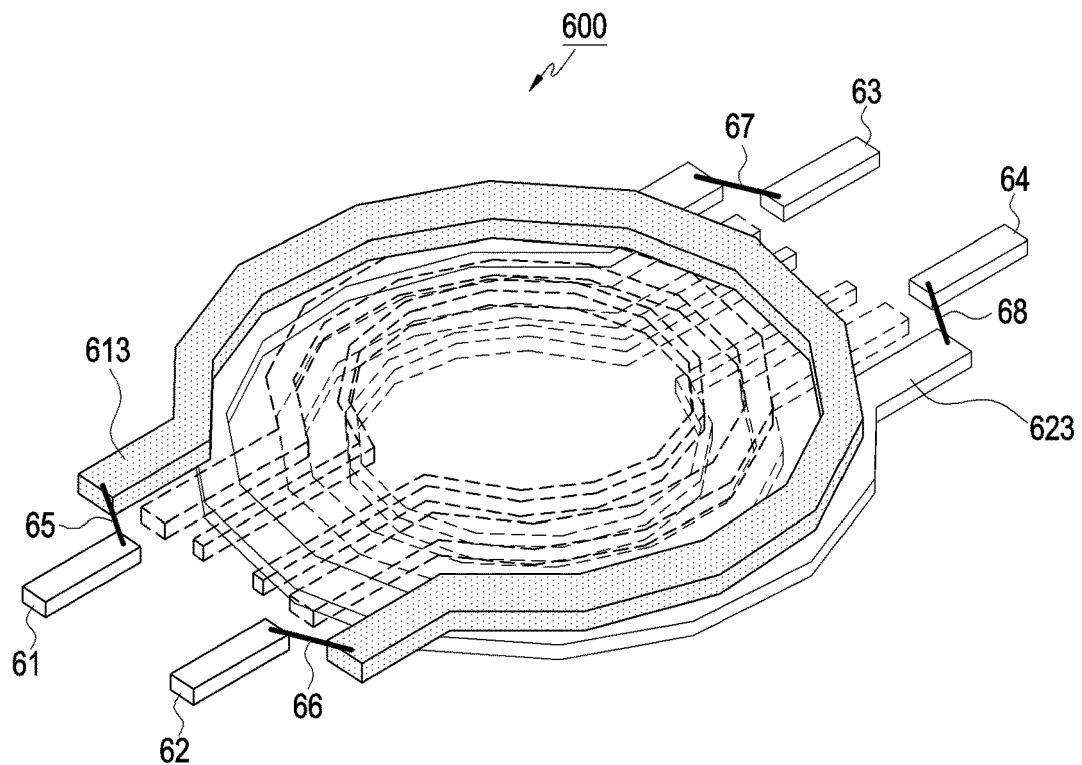
Figure 7C:
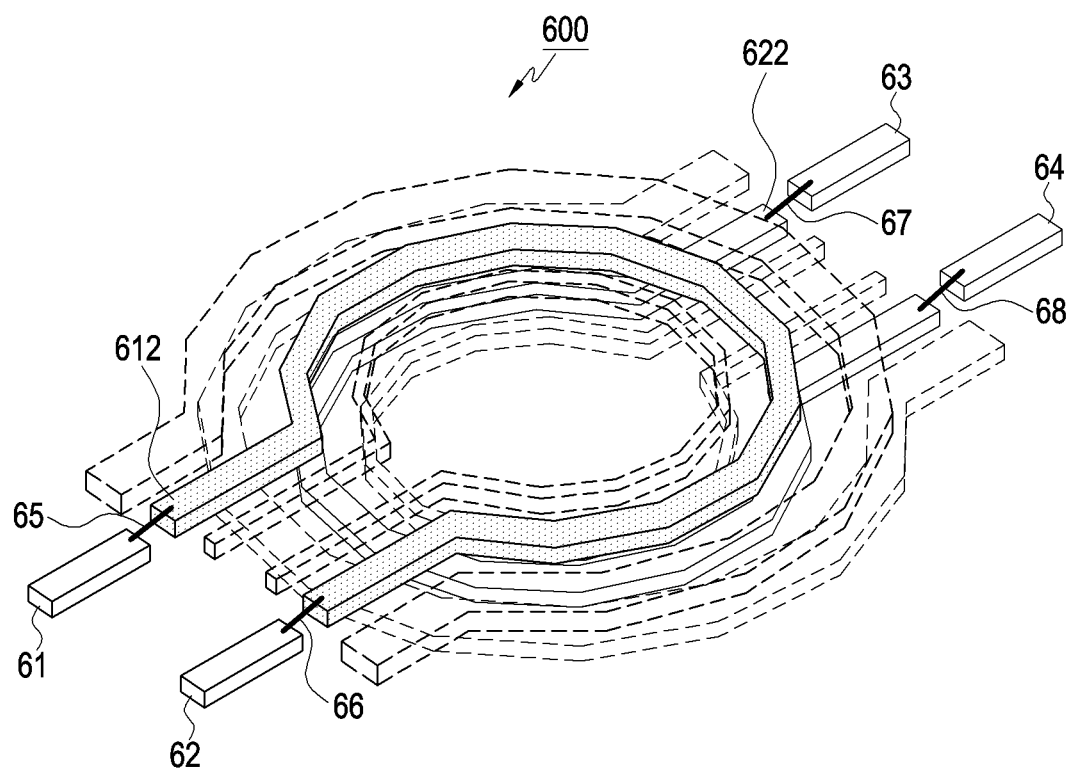

FIGS. 7A, 7B, and 7C are views illustrating operations according to each operation mode of the multi-loop ISM transformer of FIG. 6 according to various embodiments of the disclosure.

FIG. 7A illustrates an example in which the multi-loop ISM transformer of FIG. 6 operates in the first attenuation mode, which is the attenuation mode in which the attenuation level is increased. In the first attenuation mode, the multi-loop ISM transformer may perform the attenuator function according to the disclosure while performing impedance matching like the conventional ISM transformer. For example, when the multi-loop ISM transformer is used in the UE and the distance between the base station and the UE is relatively short so that the received signal strength of the downlink signal is strong, the processor in the UE controls switching of the first switches 65 and 66 and the second switches 67 and 68 according to the first attenuation mode so that the attenuation level is increased, thereby connecting the first primary loop 611, which is the inner loop of the multi-loop ISM transformer, to the output ends 61 and 62 of the first amplifier (not shown) in the amplifier device, and connecting the first secondary loop 621 to the input ends 63 and 64 of the second amplifier (not shown) in the amplifier device.

FIG. 7B illustrates a case where the multi-loop ISM transformer of FIG. 6 operates in a through mode. In the through mode, the multi-loop ISM transformer may operate in the same manner as the conventional ISM transformer described with reference to FIG. 3. In the through mode, the multi-loop ISM transformer may perform impedance matching like a conventional ISM transformer, but may not perform an attenuator function. Even if the attenuator function is not performed, there may be typical signal attenuation generated in the transformer circuit. For example, when the multi-loop ISM transformer is used in the UE and the received signal strength of the downlink signal is weak because the distance between the base station and the UE is relatively long, the processor in the UE controls switching of the first switches 65 and 66 and the second switches 67 and 68 according to the through mode such that the attenuator function is not performed as in the conventional ISM transformer, thereby connecting the third primary loop 613, which is the outer loop of the multi-loop ISM transformer, to the output ends 61 and 62 of the first amplifier (not shown) in the amplifier device, and connecting the third secondary loop 623 to the input ends 63 and 64 of the second amplifier (not shown) in the amplifier device.

FIG. 7C illustrates an example in which the multi-loop ISM transformer of FIG. 6 operates in the second attenuation mode in which the attenuation level is relatively reduced compared to the first attenuation mode. In the second attenuation mode, the multi-loop ISM transformer may perform the attenuator function according to the disclosure while performing impedance matching like a conventional ISM transformer. For example, when the multi-loop ISM transformer is used in the UE, and the distance between the base station and the UE is neither long nor short, so that the received signal strength of the downlink signal is about the medium, the processor in the UE controls switching of the first switches 65 and 66 and the second switches 67 and 68 according to the second attenuation mode such that the attenuation level is about the medium, thereby connecting the second primary loop 612, which is the intermediate loop of the multi-loop ISM transformer, to the output ends 61 and 62 of the first amplifier (not shown) in the amplifier device, and connecting the second secondary loop 622 to the input ends 63 and 64 of the second amplifier (not shown) in the amplifier device.

In the embodiments of FIGS. 7A to 7C, the nth secondary loop is switched and connected to correspond to the nth primary loop, but as an optional embodiment, the nth secondary loop may be switched and connected to correspond to the mth primary loop.

Figure 8C:
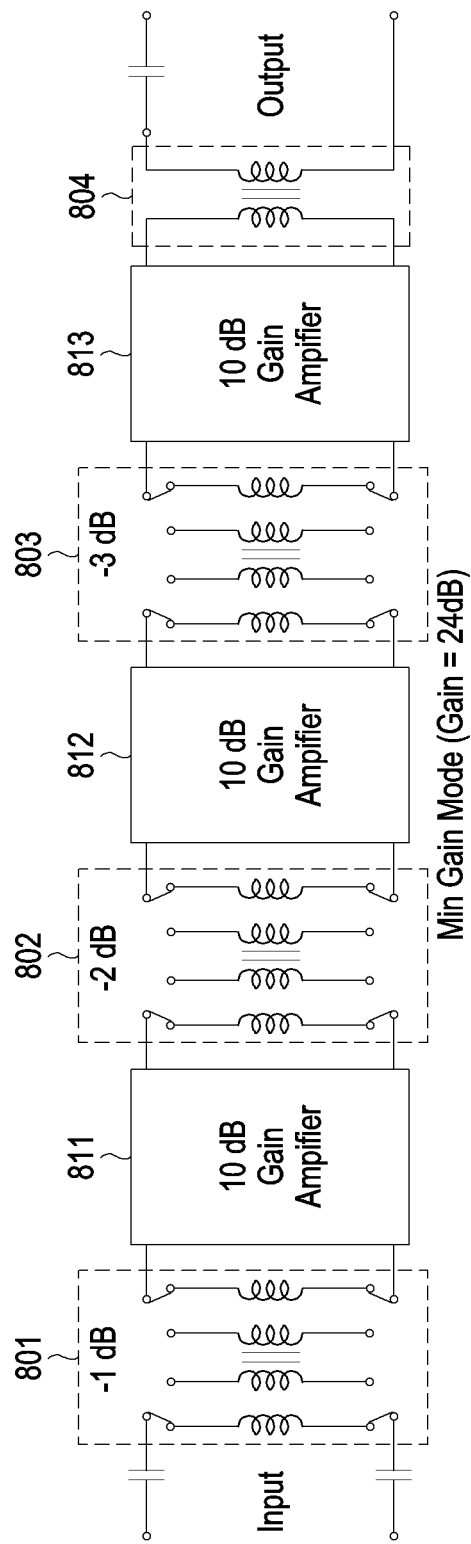

FIG. 8A illustrates operations of an amplifier device using a multi-loop ISM transformer according to an embodiment of the disclosure, FIG. 8B illustrates operations of an amplifier device using a multi-loop ISM transformer according to an embodiment of the disclosure, and FIG. 8C illustrates operations of an amplifier device using a multi-loop ISM transformer according to an embodiment of the disclosure.

Referring to FIGS. 8A, 8B, and 8C, an amplifier device includes multiple loop ISM transformers 801, 802, and 803 connected in a multi-stage structure, amplifiers 811, 812, and 813 connected in a multi-stage structure, and a single loop ISM transformer 804. The multi-loop ISM transformers 801, 802, and 803 may use the same structure as the multi-loop ISM transformer described in the embodiments of FIGS. 4 to 6, and 7A to 7C. The amplifiers 811, 812, and 813 may use general amplifiers that amplify and output an input signal. The amplifiers 811, 812, and 813 are examples of power amplifiers having a gain of 10 decibels (dB). The gains of the amplifiers 811, 812, and 813 are not limited to 10 dB. As shown in FIG. 3, the single loop ISM transformer 804 may use a conventional ISM transformer using a single loop. The examples of FIGS. 8A, 8B, and 8C illustrate an example in which a multi-loop ISM transformer using two loops is applied to a three-stage power amplifier device for convenience of description, and it should be noted that the disclosure is not limited to a three-stage power amplifier device. In other words, the disclosure may be applied to power amplifier devices having two or three or more stages.

FIG. 8A is a view illustrating operations of an amplifier device when a multi-loop ISM transformer according to an embodiment operates in a through mode. In the through mode, the multi-loop ISM transformer operates in the same manner as a conventional ISM transformer as described above to perform impedance matching, but does not perform an attenuator function. Thus, the gain of each of the multi-loop ISM transformers 801, 802, and 803 may be 0 dB, and the sum of total gains of each of the amplifiers 811, 812, and 813 having the gain of 10 dB may be 30 dB. In this case, it may be understood that the amplifier device using the multi-loop ISM transformer operates in the maximum gain mode.

FIG. 8B is a view illustrating operations of an amplifier device when a multi-loop ISM transformer according to an embodiment operates in a second attenuation mode. In the second attenuation mode, the multi-loop ISM transformer may perform impedance matching in the same manner as a conventional ISM transformer as described above, and may perform an attenuator function having an intermediate attenuation level reduced compared to the first attenuation mode. This attenuator function may also be selectively performed by at least one of the multi-loop ISM transformers 801, 802, and 803. In the example of FIG. 8B, since the gains in the multi-loop ISM transformers 801, 802, and 803 are −1 dB, −2 dB, and 0 dB, respectively, and the gain in the amplifiers 811, 812, and 813 is 10 dB, the total sum of the gains may be 27 dB. In this case, it may be understood that the amplifier device using the multi-loop ISM transformer operates in the intermediate gain mode.

FIG. 8C is a view illustrating operations of an amplifier device when a multi-loop ISM transformer according to an embodiment operates in a first attenuation mode. In the first attenuation mode, the multi-loop ISM transformer may perform an attenuator function having an increased attenuation level compared to the second attenuation mode while performing impedance matching in the same manner as a conventional ISM transformer as described above. In the example of FIG. 8C, since the gains in the multi-loop ISM transformers 801, 802, and 803 are −1 dB, −2 dB, and −3 dB, respectively, and the gain in the amplifiers 811, 812, and 813 is 10 dB, the total sum of the gains may be 24 dB. In this case, it may be understood that the amplifier device using the multi-loop ISM transformer operates in the minimum gain mode.

As in the embodiments of FIGS. 8A to 8C described above, in an amplifier device using multi-loop ISM transformers having a multi-stage structure according to the disclosure, various attenuation modes may be set by controlling the gains of the multi-loop ISM transformers in various combinations. For example, if three multi-loop ISM transformers are simultaneously adjusted, a total of six attenuation/gain modes may be set by 1 dB from 30 dB to 24 dB. Additionally, more attenuation/gain modes may be set by increasing the number of amplifiers or the number of loops of multiple loop ISM transformers.

In the disclosure, the multi-loop ISM transformer may be applied to various amplifier devices such as a power amplifier device and a low-noise amplifier device in a communication device.

Figure 9A:
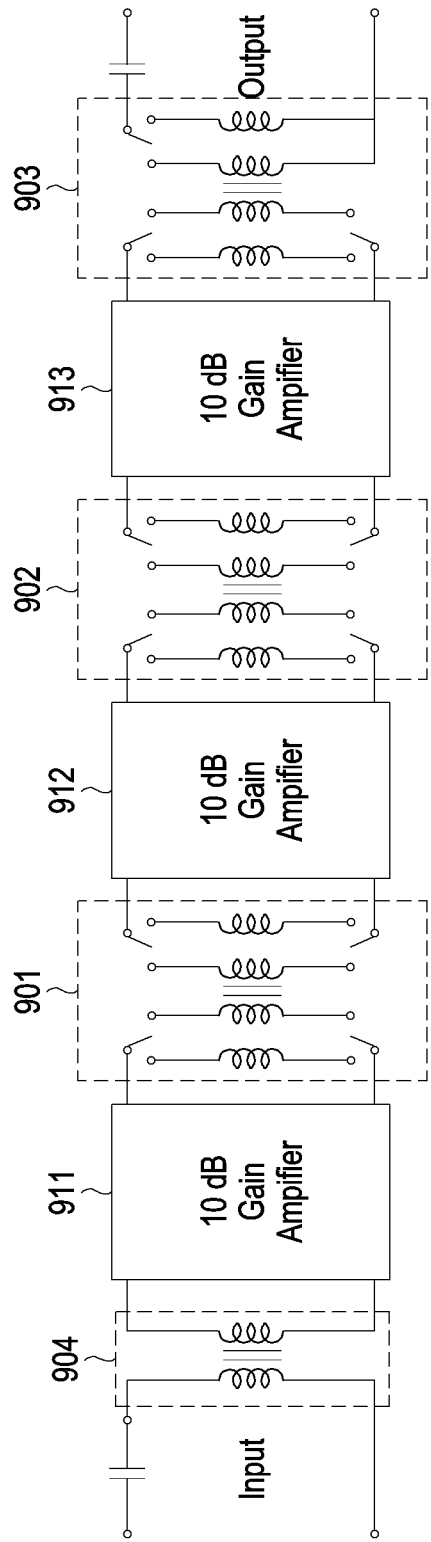
FIG. 9A is a view illustrating an example configuration of a low-noise amplifier device using a multi-loop ISM transformer according to an embodiment of the disclosure.

FIG. 9A is a view illustrating an example configuration of a low-noise amplifier device using a multi-loop ISM transformer according to an embodiment of the disclosure.

Referring to FIG. 9A, the low-noise amplifier device includes multi-loop ISM transformers 901, 902, and 903 connected in a multi-stage structure, amplifiers 911, 912, and 913 connected in a multi-stage structure, and a single-loop ISM transformer 904. The multi-loop ISM transformers 901, 902, and 903 may use the same structure as the multi-loop ISM transformer described in the embodiments of FIGS. 4 to 6, and 7A to 7C. The amplifiers 911, 912, and 913 may use general amplifiers that amplify and output an input signal. The amplifiers 911, 912, and 913 are examples of power amplifiers having a gain of 10 dB. The gains of the amplifiers 911, 912, and 913 are not limited to 10 dB. As shown in FIG. 3, the single loop ISM transformer 904 may use a conventional ISM transformer using a single loop. FIG. 9A illustrates an example in which a multi-loop ISM transformer using two loops is applied to a three-stage low-noise amplifier device for convenience of description, and it should be noted that the disclosure is not limited to a three-stage low-noise amplifier device. In other words, the disclosure may be applied to a low-noise amplifier device having two or three or more stages. In a low-noise amplifier device, the gain or loss of the first stage may greatly affect the above-described noise figure NF, and thus it is important to dispose a multi-loop ISM transformer behind the amplifier 911 of the first stage as in the example of FIG. 9A.

Figure 9B:
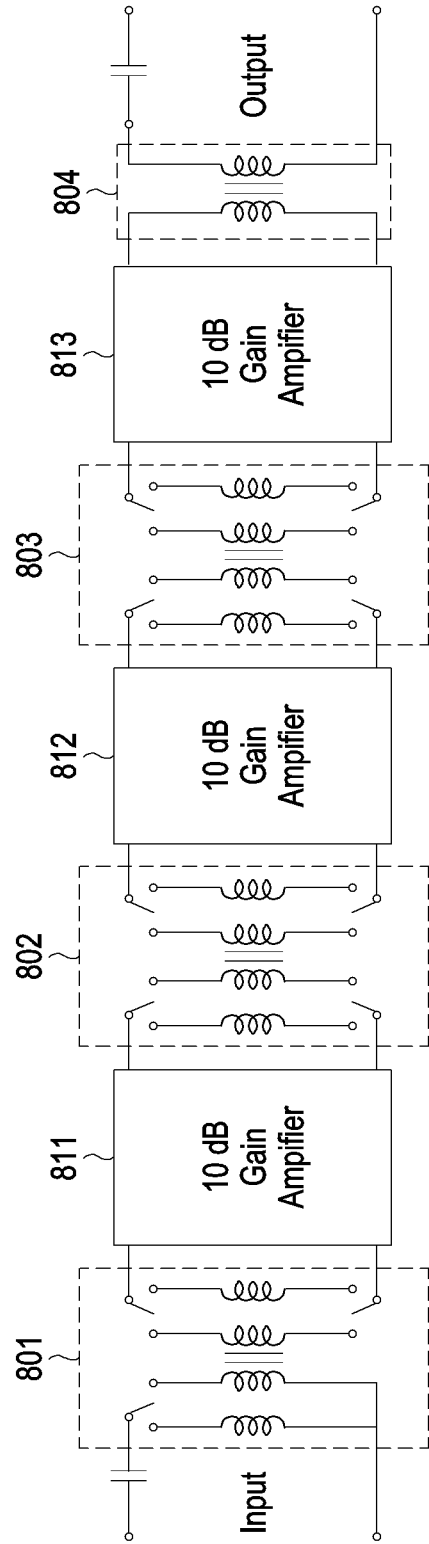
FIG. 9B is a view illustrating an example configuration of a power amplifier device using a multi-loop ISM transformer according to an embodiment of the disclosure.

FIG. 9B is a view illustrating an example configuration of a power amplifier device using a multi-loop ISM transformer according to an embodiment of the disclosure. Referring to FIG. 9B, the configuration of the power amplifier device of FIG. 9B is the same as the configuration of the amplifier device described with reference to FIGS. 8A to 8C, and thus a detailed description thereof is omitted. In a power amplifier (PA) device, linearity is important, and a gain or loss in the amplifier 813 of the last stage in amplifiers connected in a multi-stage structure may greatly affect linearity, so it is important to place a multi-loop ISM transformer in front of the amplifier 813 of the last stage as in the example of FIG. 9B.

The multi-loop ISM transformer proposed in the above-described embodiments of the disclosure adds an attenuator function to an ISM transformer basically required for impedance matching in the multi-stage amplifier. According to the disclosure, the amplifier device may not additionally use the attenuator for adjusting the gain, and as a result, the size of the RF chip including the amplifier device may be significantly reduced.

Further, in the attenuator used in the conventional amplifier device, when the number of attenuation modes is increased, the impedance matching for each attenuation/gain mode may not be uniform due to the parasitic capacitance component of the transistor in the attenuator circuit, and thus the amplifier characteristics for each attenuation/gain mode may be changed. On the other hand, in the amplifier device using the multi-loop ISM transformer proposed in the disclosure, the attenuation level may be adjusted while maintaining impedance matching, and thus the amplifier characteristics for each attenuation/gain mode may be uniform.

Figure 10:
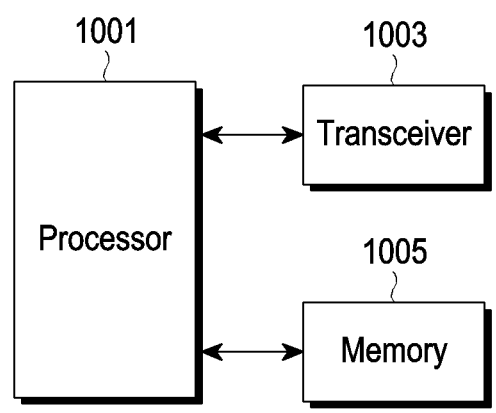
FIG. 10 is a view illustrating a configuration of a communication device in a wireless communication system according to an embodiment of the disclosure.

FIG. 10 is a view illustrating a configuration of a communication device in a wireless communication system according to an embodiment of the disclosure. The communication device of FIG. 10 may be one of a UE and a base station including an amplifier device using the multi-loop ISM transformer described in the embodiments of FIGS. 4 to 6, 7A to 7C, 8A to 8C, 9A, and 9B.

The communication device of FIG. 10 may include a processor 1001 for controlling the overall operation of the communication device, a transceiver 1003 including a transmitter and a receiver, and a memory 1005. Of course, the communication device may include more or fewer components than the components illustrated in FIG. 10. The transceiver 1003 of the disclosure may include an amplifier device using the multi-loop ISM transformer, and may amplify the transmission or reception signal through the amplifier device and transmit and receive a signal to and from at least one of other network entities (base station or UE). The amplifier device using the multi-loop ISM transformer may be included in an RF chip in the communication device, and the transceiver 1003 may include the RF chip. The processor 1001 may control the overall operation of the communication device to perform the operation according to the combination of one or more embodiments of the above-described embodiments of FIGS. 3 to 6, 7A to 7C, 8A to 8C, 9A, and 9B. The processor 1001, the transceiver 1003, and the memory 1005 are not necessarily implemented in separate modules but rather as one component, such as a single chip. The memory 1005 may store a basic program for operating the communication device, application programs, configuration information, or other data. The memory 1005 provides the stored data according to a request of the processor 1001. The memory 1005 may include a storage medium, such as read-only memory (ROM), random-access memory (RAM), hard disk, compact disc read-only memory (CD-ROM), and digital versatile disc (DVD), or a combination of storage media. There may be provided a plurality of memories 1005. The processor 1001 may perform at least one of the above-described embodiments based on a program for performing operations according to at least one of the above-described embodiments stored in the memory 1005.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A communication device configured to transmit/receive a radio frequency (RF) signal in a wireless communication system, comprising:
   a transceiver including an amplifier device using a multi-loop inter-stage matching (ISM) transformer; and
   a processor configured to:
      control an operation of the amplifier device based on a signal strength during transmission/reception of the RF signal,
   wherein the multi-loop ISM transformer is disposed between a first amplifier and a second amplifier and includes a plurality of primary loops and a plurality of secondary loops, wherein each primary loop includes an inductor component and having a different size and a different Q-factor and each secondary loop includes an inductor component and having a different size and a different Q-factor, and
   wherein the processor is further configured to:
      adjust an attenuation level of the multi-loop ISM transformer by controlling a switching connection to the first amplifier and the second amplifier for one primary loop among the plurality of primary loops and one secondary loop among the plurality of secondary loops in the multi-loop ISM transformer.

2. The communication device of claim 1,
   wherein input ends of the one primary loop are connected to output ends of the first amplifier through first switches,
   wherein output ends of the one secondary loop are connected to input ends of the second amplifier through second switches, and
   wherein the processor is further configured to:
      control switching of the first switches and the second switches so that the one primary loop and the one secondary loop operate as a resonance circuit.

3. The communication device of claim 2, wherein the processor is further configured to:
   in case that increase of the attenuation level is required due to a strong signal intensity, control the switching of the first switches and the second switches to connect an inner primary loop of the multi-loop ISM transformer to the output ends of the first amplifier and connect an inner secondary loop of the multi-loop ISM transformer to the input ends of the second amplifier.

4. The communication device of claim 3, wherein the processor is further configured to:

in case that decrease of the attenuation level is required due to a weak signal intensity, control the switching of the first switches and the second switches to connect an outer primary loop of the multi-loop ISM transformer to the output ends of the first amplifier and connect an outer secondary loop of the multi-loop ISM transformer to the input ends of the second amplifier.

5. The communication device of claim 1,
wherein the plurality of primary loops and the plurality of secondary loops include first to $n^{th}$ primary loops and first to $n^{th}$ secondary loops, respectively, in a direction from an inner loop to an outer loop,
wherein the first to $n^{th}$ primary loops and the first to $n^{th}$ secondary loops are configured to have different inductance values and different Q factors, and
wherein the processor is further configured to:
adjust the attenuation level of the multi-loop ISM transformer based on the signal strength.

6. The communication device of claim 5, wherein the attenuation level is inversely proportional to a coupling coefficient corresponding to at least one of a size or a width of the one primary loop and the one secondary loop.

7. The communication device of claim 1,
wherein the amplifier device includes multi-loop ISM transformers disposed in multiple stages, and
wherein, based on the amplifier device comprising a low-noise amplifier device, the multi-loop ISM transformers are disposed behind an amplifier of a first stage in the amplifier device.

8. The communication device of claim 1,
wherein the amplifier device includes multi-loop ISM transformers disposed in multiple stages, and
wherein, based on the amplifier device comprising a power amplifier device, the multi-loop ISM transformers are disposed in front of an amplifier of a last stage in the amplifier device.

9. The communication device of claim 1,
wherein the processor is further configured to:
control an operation of the multi-loop ISM transformer by an operation mode selected among a plurality of operation modes and determined based on the signal strength, the plurality of operation modes being preset based on a degree of the attenuation level, and
wherein the plurality of operation modes include a through mode in which an attenuator function is not performed in the multi-loop ISM transformer, a first attenuation mode in which the attenuation level increases while the signal strength is strong, and a second attenuation mode having a low attenuation level lower than the first attenuation mode.

10. The communication device of claim 1, wherein, in the amplifier device, impedance matching of the multi-loop ISM transformer is maintained based on a Q-factor.

11. An amplifier device included in a communication device configured to transmit/receive a radio frequency (RF) signal in a wireless communication system, the amplifier device comprising:
a plurality of amplifiers; and
a multi-loop inter-stage matching (ISM) transformer disposed between a first amplifier and a second amplifier among the plurality of amplifiers and including a plurality of primary loops and a plurality of secondary loops, wherein each primary loop includes an inductor component and having a different size and a different Q-factor and each secondary loop includes an inductor component and having a different size and a different Q-factor,
wherein input ends of the plurality of primary loops are connected to output ends of the first amplifier through first switches,
wherein output ends of the plurality of secondary loops are connected to input ends of the second amplifier through second switches, and
wherein one primary loop among the plurality of primary loops and one secondary loop among the plurality of secondary loops are connected to the first amplifier and the second amplifier, respectively, through the first switches and the second switches to adjust an attenuation level of the multi-loop ISM transformer.

12. The amplifier device of claim 11,
wherein the plurality of primary loops and the plurality of secondary loops include first to $n^{th}$ primary loops and first to $n^{th}$ secondary loops, respectively, in a direction from an inner loop to an outer loop, and
wherein the first to $n^{th}$ primary loops and the first to $n^{th}$ secondary loops are configured to have different inductance values and different Q factors to adjust the attenuation level.

13. The amplifier device of claim 11, wherein the attenuation level is inversely proportional to a coupling coefficient corresponding to at least one of a size or a width of the one primary loop and the one secondary loop.

14. The amplifier device of claim 11, further comprising:
multi-loop ISM transformers disposed in multiple stages,
wherein, based on the amplifier device comprising a low-noise amplifier device, the multi-loop ISM transformers are disposed behind an amplifier of a first stage in the amplifier device.

15. The amplifier device of claim 11, further comprising:
multi-loop ISM transformers disposed in multiple stages,
wherein, based on the amplifier device comprising a power amplifier device, the multi-loop ISM transformers are disposed in front of an amplifier of a last stage in the amplifier device.

* * * * *